(12) United States Patent
Wakabayashi

(10) Patent No.: US 11,578,750 B2
(45) Date of Patent: Feb. 14, 2023

(54) ANTI-LOOSENING ADJUSTMENT BOLT ASSEMBLY

(71) Applicant: HARDLOCK INDUSTRY CO., LTD., Osaka (JP)

(72) Inventor: Katsuhiko Wakabayashi, Osaka (JP)

(73) Assignee: Hardlock Industry Co., Ltd., Osaka (JP)

(*) Notice: Subject to any disclaimer, the term of this patent is extended or adjusted under 35 U.S.C. 154(b) by 581 days.

(21) Appl. No.: 16/630,749

(22) PCT Filed: Jun. 11, 2018

(86) PCT No.: PCT/JP2018/022180
§ 371 (c)(1),
(2) Date: Jan. 13, 2020

(87) PCT Pub. No.: WO2019/031052
PCT Pub. Date: Feb. 14, 2019

(65) Prior Publication Data
US 2020/0166070 A1   May 28, 2020

(30) Foreign Application Priority Data

Aug. 9, 2017 (JP) .............................. JP2017-153797

(51) Int. Cl.
*F16B 39/12* (2006.01)
*G10D 13/16* (2020.01)
(Continued)

(52) U.S. Cl.
CPC ............ *F16B 39/122* (2013.01); *F16B 37/00* (2013.01); *G10D 13/10* (2020.02); *G10D 13/16* (2020.02)

(58) Field of Classification Search
CPC ...... G10D 13/10; G10D 13/16; F16B 39/122; F16B 37/00
See application file for complete search history.

(56) References Cited

U.S. PATENT DOCUMENTS 1,832,060 A * 11/1931 Strid ................... F16B 39/2825
411/936
4,750,401 A * 6/1988 Hoshino ................... F16B 7/06
984/151
(Continued)

FOREIGN PATENT DOCUMENTS

JP        H07302076 A    11/1995
JP         H116516 A     1/1999
(Continued)

*Primary Examiner* — Robert W Horn
(74) *Attorney, Agent, or Firm* — Wood, Phillips, Katz, Clark & Mortimer

(57) ABSTRACT

It is made possible to give prevailing torque to an adjustment bolt in a simple manner without troublesome adjustment work. An anti-loosening adjustment bolt assembly includes: a cylindrical pipe (6) adapted to be fitted on the screw shaft (2a) of the adjustment bolt (2); and a nut (7) having a threaded hole for allowing the screw shaft (2a) to be threadably mounted thereon; the bottom of the nut (7) includes a recess (7a) adapted to allow the upper end of the cylindrical pipe (6) to be fitted therein; the inner peripheral surface of the recess (7a) is a taper surface decreasing in diameter toward the interior; and the axis of the taper surface is slightly eccentric from the axis of the threaded hole such that, when the nut (7), threadably secured to the screw shaft (2a), is screwed toward the cylindrical pipe (6), a circumferential portion of the eccentric taper surface comes into pressure-contact with the upper end of the cylindrical pipe (6) and the axis (Q) of the threaded hole of the nut (7) is eccentric and/or inclined from the axis (O) of the screw shaft (2a) to generate prevailing torque depending on the amount of tightening of the nut (7) on the adjustment bolt (2).

2 Claims, 5 Drawing Sheets

(51) Int. Cl.
*F16B 37/00* (2006.01)
*G10D 13/10* (2020.01)

(56) References Cited

U.S. PATENT DOCUMENTS

| | | | | |
|---|---|---|---|---|
| 6,220,801 | B1* | 4/2001 | Lin | F16B 31/02 |
| | | | | 411/533 |
| 6,459,026 | B1* | 10/2002 | Bozzio | G10D 13/02 |
| | | | | 84/411 R |
| 6,686,527 | B2* | 2/2004 | Hagiwara | G10D 13/16 |
| | | | | 84/411 R |
| 9,679,545 | B1* | 6/2017 | Chen | G10D 13/02 |
| 10,157,599 | B2* | 12/2018 | Chen | G10D 13/16 |
| 10,366,680 | B2* | 7/2019 | Hirasawa | G10D 13/16 |
| 11,098,748 | B2* | 8/2021 | Limatoc | F16B 39/122 |
| 11,328,698 | B2* | 5/2022 | Sikra | G10D 13/16 |
| 2004/0081531 | A1* | 4/2004 | Keane | F16B 39/10 |
| | | | | 411/119 |
| 2007/0071573 | A1* | 3/2007 | Uryu | F16B 39/122 |
| | | | | 411/269 |
| 2008/0173157 | A1* | 7/2008 | Liao | G10D 13/02 |
| | | | | 84/421 |
| 2020/0166070 | A1* | 5/2020 | Wakabayashi | F16B 37/00 |
| 2021/0222726 | A1* | 7/2021 | Lin | F16B 39/122 |

FOREIGN PATENT DOCUMENTS

| | | | |
|---|---|---|---|
| JP | 2008014402 | A | 1/2008 |
| JP | 2009047780 | A | 3/2009 |
| JP | 2021165587 | A * | 10/2021 |

* cited by examiner

ANTI-LOOSENING ADJUSTMENT BOLT ASSEMBLY

TECHNICAL FIELD

The present invention relates to an anti-loosening adjustment bolt assembly, such as a tension bolt, of a drum.

BACKGROUND ART

A drum is a typical and well-known percussion instrument. A drum includes, as shown in FIG. 5, a head 1 and a plurality of tension bolts (or adjustment bolts) 2 for adjusting the tension of the head. The tension bolts 2 adjust the tension of the head 1 by fastening a hoop (or rim) 3 provided on the periphery of the head 1 to lugs 5, which are mounted on the peripheral surface of a shell 4. A threaded cylindrical pipe 6 may be fixed to each lug 5 and may be threadably secured to a tension bolt 2.

The applicant of the present application is aware of the following prior art documents.

PRIOR ART DOCUMENTS

Patent Documents

Patent Document 1: JP Hei7(1995)-302076 A
Patent Document 2: JP 2009-47780 A

SUMMARY OF THE INVENTION

Problems to be Solved by the Invention

Since a drum is a percussion instrument, tension bolts may be loosened by vibrations during a performance, especially a hard-rock or heavy-metal music performance. The tension of the head affects the drum's pitch (i.e., how high its sound is); as such, maintaining a tension level that has been achieved by appropriate tuning is important in maintaining the quality of the sound toward the end of the piece.

To prevent the bolts from loosening, washers or stoppers are used; however, washers do not provide sufficient anti-loosening effects, while stoppers must be removed each time the drum is tuned, which is troublesome work.

Means for Solving the Problems

An anti-loosening adjustment bolt assembly according to the present invention may include an adjustment bolt having a screw shaft adapted to be threadably received in a female screw with an adjustable amount of tightening; a cylindrical pipe adapted to allow the screw shaft to be inserted therein and located at a fixed axial position relative to the female screw; and a nut having a threaded hole adapted to allow the screw shaft to be threadably received therein. The female screw may be formed on an inner periphery of the cylindrical pipe or may be formed on another member on which the inventive anti-loosening structure for an adjustment bolt is mounted. One of end surfaces of the nut as determined along an axial direction may include a recess adapted to allow one end of the cylindrical pipe to be put thereinto. An inner peripheral surface of the recess may be a taper surface decreasing in diameter toward an interior. It is preferable that an axis of the taper surface be eccentric from an axis of the threaded hole such that, when the nut, threadably received in the screw shaft, is tightened toward the cylindrical pipe, the eccentric taper surface comes into pressure-contact with the one end of the cylindrical pipe and the axis of the threaded hole of the nut is eccentric and/or inclined from an axis of the screw shaft to generate prevailing torque depending on an amount of tightening of the nut on the adjustment bolt. The maximum diameter of the taper surface, measured at its opening end, may be larger than the outer diameter of the cylindrical pipe, and the minimum diameter of the taper surface, measured at the interior, may be smaller than the outer diameter of the cylindrical pipe.

According to the present invention, when the nut is screwed toward the cylindrical pipe, one end of the cylindrical pipe comes into strong pressure-contact with a circumferential portion of the eccentric taper surface of the nut such that the nut is slightly eccentric and/or inclined from the screw shaft within the range for fitting between the threaded hole of the nut and the screw shaft and a circumferential portion of the threaded hole of the nut is laterally pushed against the screw shaft such that the frictional resistance between the nut and screw shaft gives prevailing torque to the adjustment bolt. The magnitude of this prevailing torque depends on the amount of tightening (i.e., tightening force) of the nut; accordingly, if a large anti-loosening effect is to be generated, the nut may be tightened with a large tightening force; on the other hand, if it is desired that the adjustment bolt be rotatable with a relatively small force for convenience during tuning or for other purposes, the nut may be tightened with a relatively small tightening force. When the nut is tightened, the axis of the threaded hole of the nut is eccentric and/or inclined from the axis of the screw shaft; as such, when the adjustment bolt is loosened, the nut does not corotate because the rotational axis of the screw shaft of the bolt is slightly displaced from the rotational axis of the nut, making it possible to loosen and tighten the adjustment bolt while appropriate prevailing torque is present.

According to the present invention, it is preferable that the female screw be on the inner periphery of the cylindrical pipe; alternatively, the cylindrical pipe may be a simple sleeve and a separate tension-holding nut having a female screw may be provided on the tip of the cylindrical pipe to allow the adjustment bolt to be threadably mounted on the tension-holding nut.

Effects of the Invention

The present invention makes it possible to give prevailing torque to the adjustment bolt in a simple manner without troublesome adjustment work, thereby achieving loosening prevention of the adjustment bolt.

EMBODIMENTS FOR CARRYING OUT THE INVENTION

Preferred embodiments of the present invention will now be described with reference to the drawings.

Figure 1:
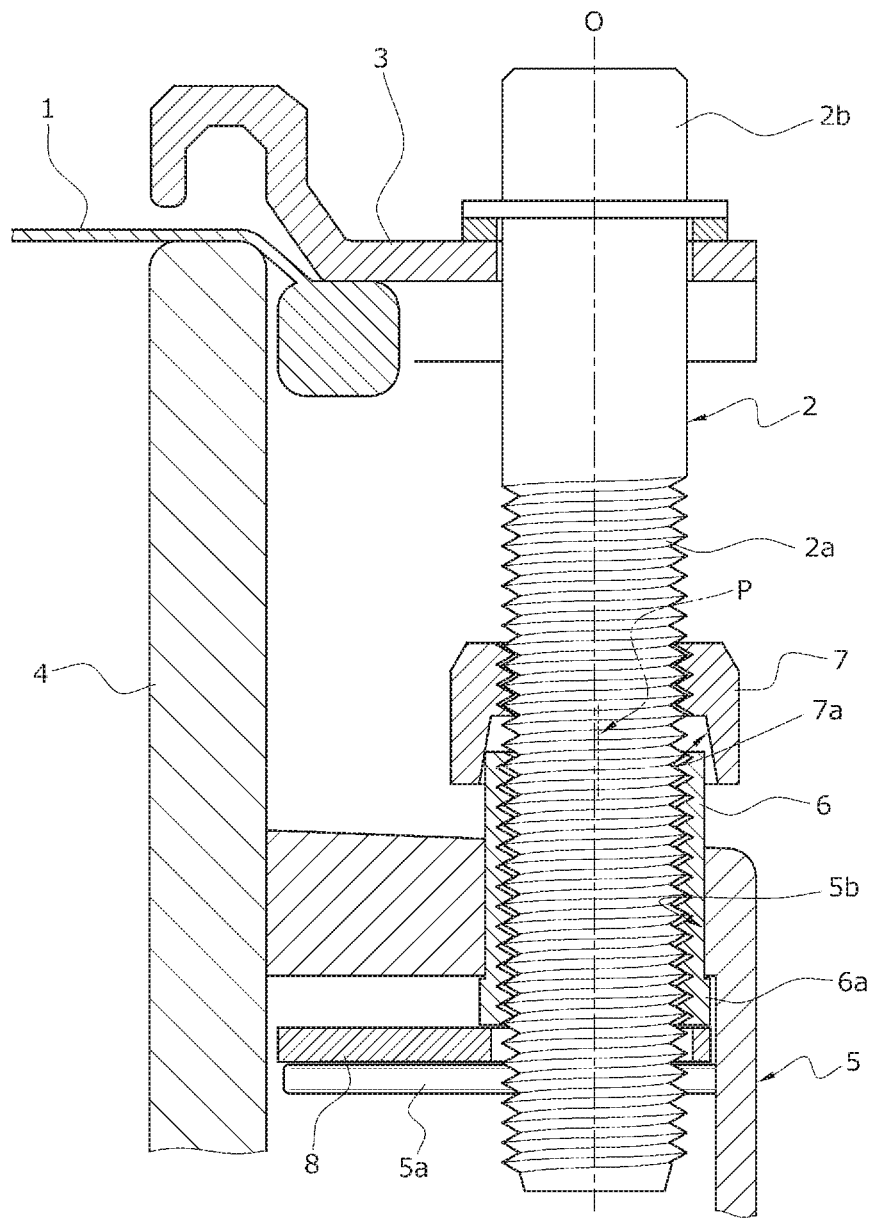
FIG. 1 is an enlarged cross-sectional view of an anti-loosening adjustment bolt assembly according to an embodiment of the present invention, as found when the nut is not tightened onto the cylindrical pipe.
Figure 2:
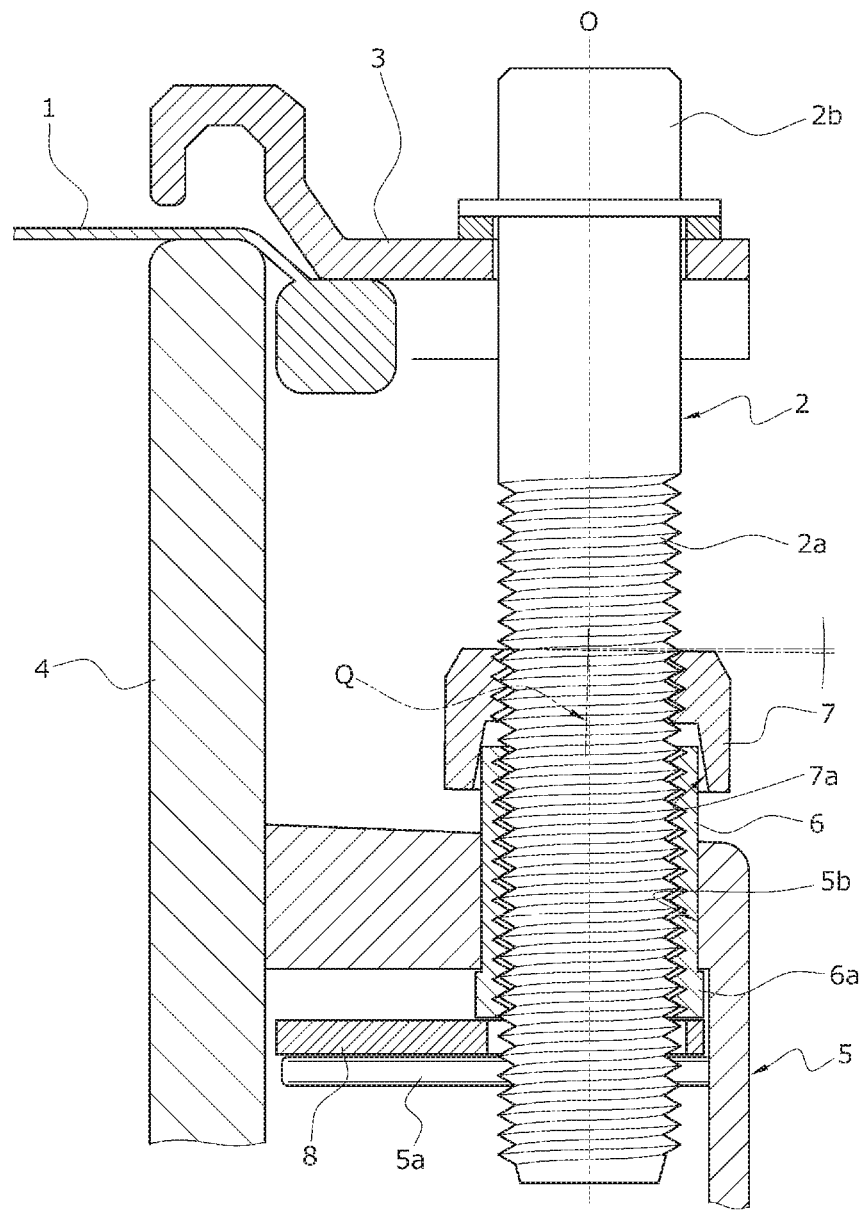
FIG. 2 is an enlarged cross-sectional view of the structure as found when the nut is tightened onto the cylindrical pipe.
Figure 3:
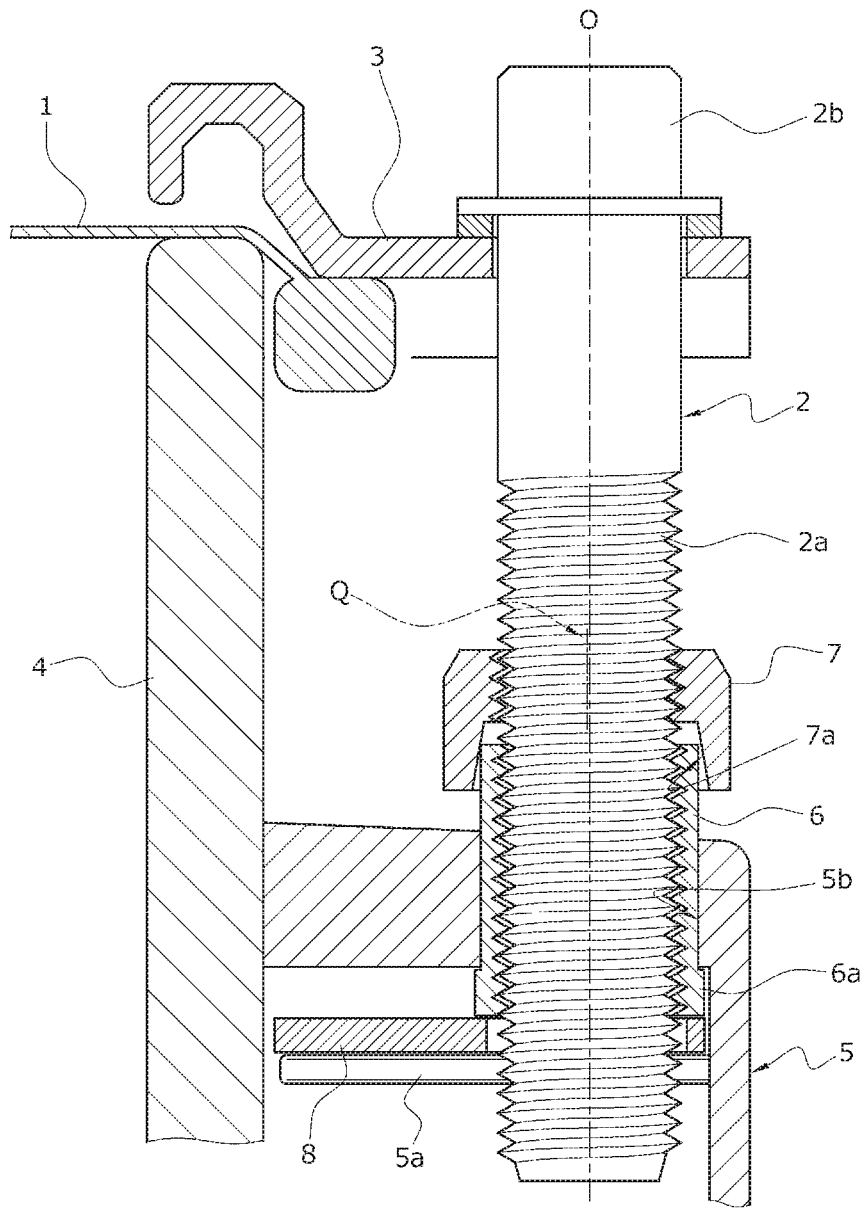
FIG. 3 is an enlarged cross-sectional view of another implementation as found when the nut is tightened onto the cylindrical pipe.
Figure 5:
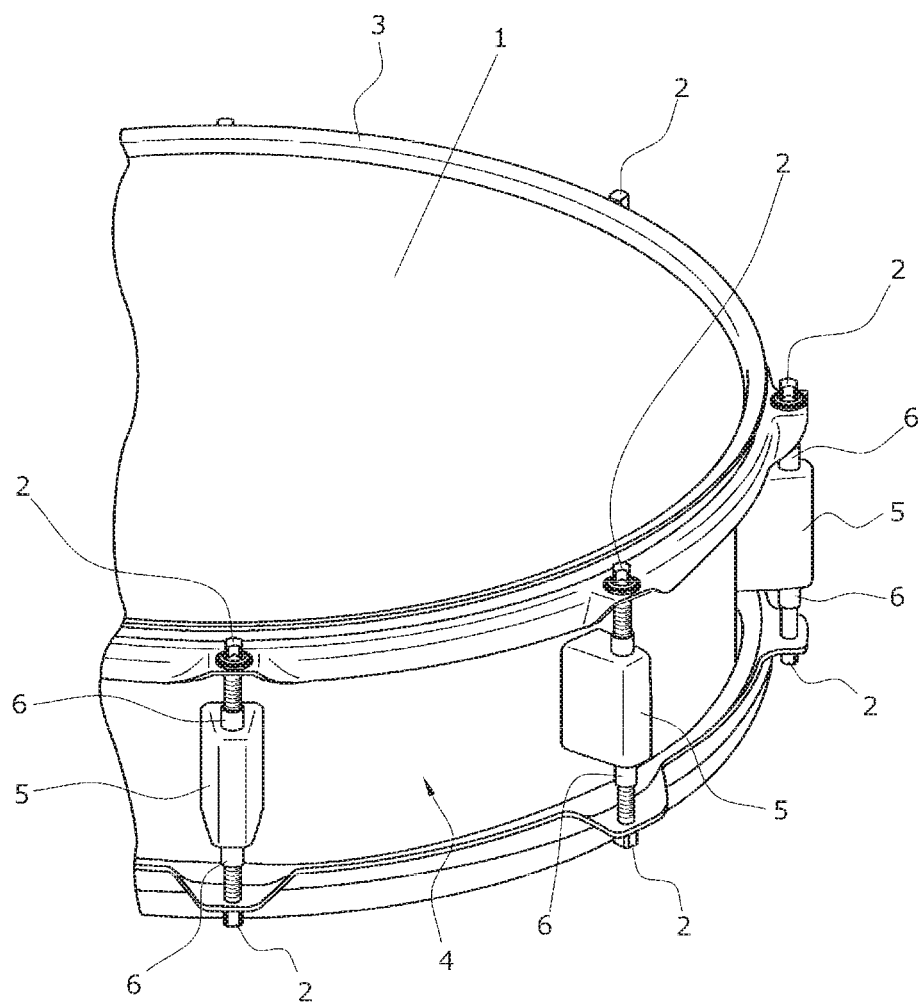
FIG. 5 is a perspective view of a typical construction of a drum.

FIGS. 1 to 3 show anti-loosening structures according to embodiments of the present invention, including a conventional tension bolt 2 (or adjustment bolt) for a drum, as shown in FIG. 5, and a nut 7 attached thereto for generating prevailing torque.

The tension bolt 2 may be made of metal and include a screw shaft 2a and a bolt head 2b that is integral to the base end of the shaft, the bolt head having a square or hexagonal cross-sectional shape. A flange may be provided on the lower edge of the bolt head 2b. A washer, made of metal or cloth, may be provided between the lower surface of the flange and the upper surface of a hoop 3, as shown.

The hoop 3, as a whole, is ring-shaped, and is constructed to push a peripheral ring on the periphery of the drumhead 1 from above.

A lug 5 is mounted on, and secured to, the shell 4 by a peg (not shown), for example. An attachment hole 5b is formed to be open on the top of the lug 5, and a threaded cylindrical pipe 6, shaped as a circular cylinder, is fitted into the attachment hole 5b from below. On the lower end of the cylindrical pipe 6 is provided a flange 6a for engaging the lug 5 to prevent the pipe from rotating relative to the lug, the flange being shaped as a square plate, for example, where the flange 6a engages the inner periphery of the lug 5 to prevent the cylindrical pipe 6 from slipping upward through the attachment hole 5b. Further, a rib 5a is provided on the inner side wall of the lug 5, and a fixing plate 8 is inserted into a space between the rib and the flange 6a to prevent the cylindrical pipe 6 from slipping downward.

The cylindrical pipe 6 may be made of metal, such as brass. A female screw is formed on the inner periphery of the cylindrical pipe 6 along the entire axial length. The screw shaft 2a of the tension bolt 2 is threadably mounted on the female screw of the cylindrical pipe 6. Thus, when the tension bolt 2 is tightened, the hoop 3 is fastened downward toward the lug 5, thereby increasing the tension of the head 1.

The upper end (or one end) of the cylindrical pipe 6 protrudes upward from the lug 5, and the nut 7 is threadably secured to a position on the screw shaft 2a that is located higher than the upper end of the cylindrical pipe 6.

A recess 7a is provided on the bottom of the nut 7 (or one of the nut's sides as determined along the axial direction) for allowing the upper end of the cylindrical pipe 6 to be fitted therein. The hole thread of the nut 7 is not present in the axial range associated with the recess 7a; the hole thread is positioned higher than the recess 7a.

The inner peripheral surface of the recess 7a of the nut 7 is a taper surface that decreases in diameter toward the interior and has an axis P slightly eccentric from the axis O of the threaded hole. Further, the maximum diameter of the taper surface, measured at its lower end, is larger than the outer diameter of the cylindrical pipe 6, and the minimum diameter of the taper surface, measured at its upper end, is substantially equal to or smaller than the outer diameter of the cylindrical pipe 6. Thus, when the nut 7, threadably secured to the screw shaft 2a, is tightened toward the cylindrical pipe 6, a circumferential portion of the eccentric taper surface (i.e., its left portion in FIGS. 1 to 3) comes into pressure-contact with the upper end of the cylindrical pipe 6 such that the nut 7 slightly moves in a radial direction and slightly inclines within the range of flexibility for fitting between the threaded hole of the nut 7 and the screw shaft 2a such that, as shown in FIG. 2, the axis Q of the threaded hole of the nut 7 is slightly eccentric and slightly inclined from the axis O of the screw shaft 2a to generate prevailing torque depending on the amount of tightening (i.e., tightening force) of the nut 7 on the tension bolt 2.

Figure 4:
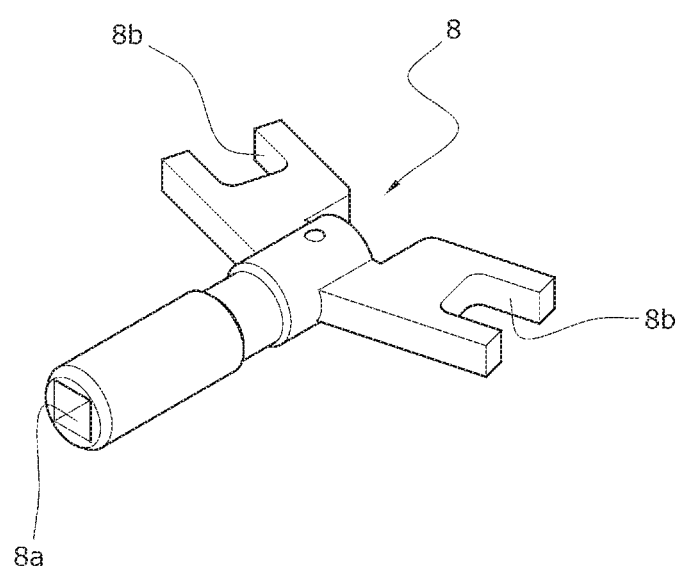
FIG. 4 is a perspective view of a tool for tightening the adjustment bolt and nut.

When the nut 7 is thus tightened, the axis Q of the threaded hole of the nut 7 is eccentric and inclined from the axis O of the screw shaft 2a; as such, when the tension bolt 2 is loosened or tightened, the nut 7 does not corotate, making it possible to adjust the tension of the head 1 using the tension bolt 2 while appropriate prevailing torque is present. Thus, as shown in FIG. 4, for example, one may carry a single tool 8 including a first engagement portion 8a for tightening the tension bolt 2 and second engagement portions 8b for tightening the nut 7, the first and second engagement portions being integrally formed, and may first use one of the second engagement portions 8b to tighten the nut 7 to an appropriate extent; with prevailing torque depending on this tightening force of the nut 7 being present, he may then use the first engagement portion 8a to rotate the tension bolt 2.

Further, the axial tensile force generated in the screw shaft 2a of the tension bolt 2 and the prevailing torque produced by a so-called wedge effect in a lateral direction (i.e. direction perpendicular to the axial direction) generated on the screw shaft 2a by the nut 7 prevent the tension bolt 2 from loosening even during a heavy drumming session, thereby preventing the pitch of the drum (i.e., how high its sound is) from departing from the suitable range even toward the end of the piece, thus making it possible to achieve a performance with good sound up until the end of the concert.

The present invention is not limited to the above-illustrated embodiments, and may be applied to anti-loosening structures for various adjustment bolts for tightening-force adjustments in various devices and appliances, or for various adjustment bolts for axial-position adjustments. Further, although the female screw is provided on the cylindrical pipe 6 in the above-illustrated embodiments, the female screw may be provided on the lug 5 or the screw shaft 2a may be threadably mounted on a female screw provided on another nut contained in the lug 5.

Further, in the implementation shown in FIG. 2, the nut 7 is mounted with its threaded-hole axis inclined; alternatively, for some taper angles for the taper surface or for some size designs, the nut 7 may be mounted with its threaded-hole axis Q slightly eccentric from the axis O of the screw shaft 2a without the nut 7 being inclined, as shown in FIG. 3; in such implementations, again, the eccentricity of the axes from each other prevents the nut 7 from corotating with the screw shaft 2a.

The invention claimed is:

1. An anti-loosening adjustment bolt assembly, comprising:
    an adjustment bolt having a screw shaft threadably received from above in a female screw with an adjustable amount of tightening;
    a cylindrical pipe adapted to allow the screw shaft to be inserted therein and located at a fixed axial position relative to the female screw; and
    a nut having a threaded hole adapted to allow the screw shaft to be threadably received therein, the nut being threadably secured to a position on the screw shaft that is located higher than the upper end of the cylindrical pipe, wherein a bottom of the nut as determined along an axial direction includes a recess adapted to allow an upper end of the cylindrical pipe to be put thereinto, an inner peripheral surface of the recess is a taper surface decreasing in diameter toward an interior, and an axis of the taper surface is eccentric from an axis of the threaded hole such that, when the nut, threadably received in the screw shaft, is tightened toward the cylindrical pipe, the eccentric taper surface comes into pressure-contact with the upper end of the cylindrical pipe and the axis of the threaded hole of the nut is eccentric and/or inclined from an axis of the screw shaft to generate prevailing torque depending on an amount of tightening of the nut on the adjustment bolt.

2. The anti-loosening adjustment bolt assembly according to claim 1, wherein the female screw is formed on an inner periphery of the cylindrical pipe.

* * * * *